Patented Jan. 18, 1949

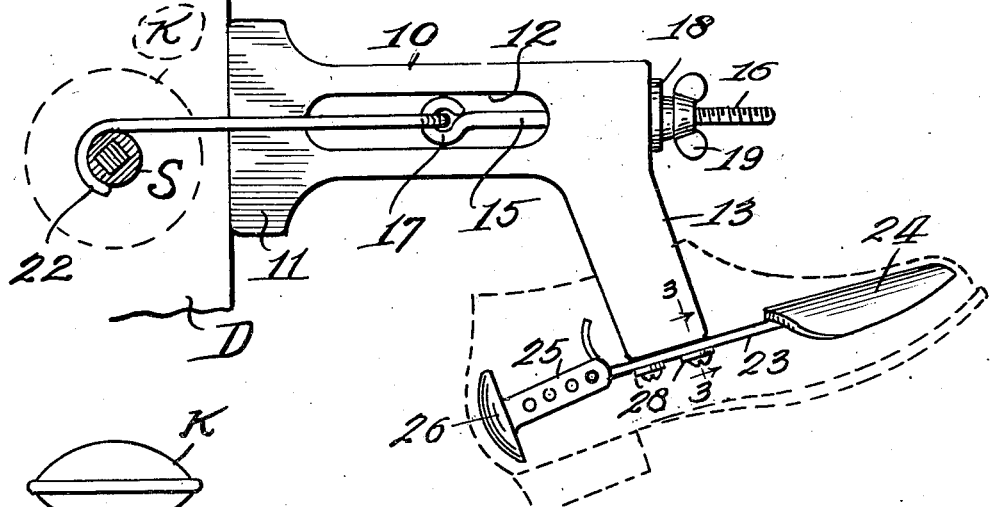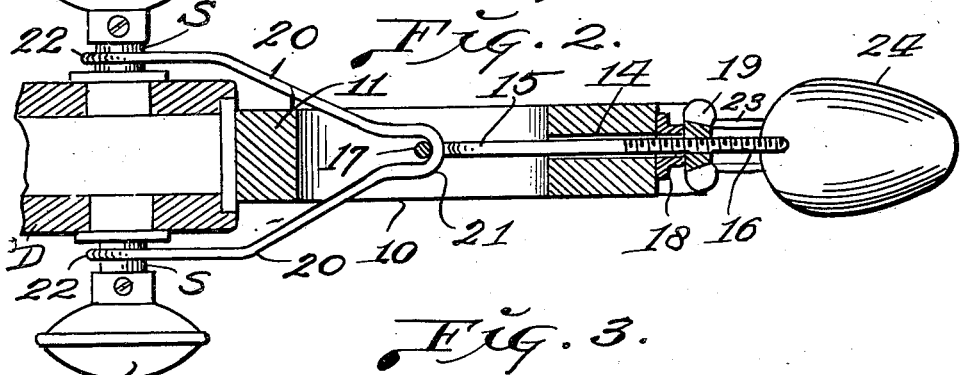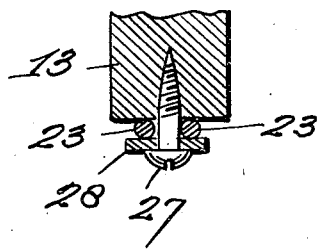

2,459,310

UNITED STATES PATENT OFFICE 2,459,310

SHOE POLISHING BRACKET AND TREE

Ira R. Crow, Los Angeles, Calif.

Application August 12, 1947, Serial No. 768,211

1 Claim. (Cl. 12—123)

My invention relates to a bracket and tree for receiving and firmly holding shoes while same are being cleaned and polished and the principal object of my invention is, to provide a simple, practical bracket and shoe tree, which may be readily applied to and removed from the edge of a door and which will firmly support in position, the tree or form on which shoe is mounted.

A further object of my invention is, to provide a bracket with simple and effective means, including hooks, for detachably mounting said bracket on a door, with said hooks engaged with the knob carrying spindle of the door lock, and said bracket having a depending arm on which is adjustably mounted, the tree or form which receives and supports the shoe.

With the foregoing and other objects in view, my invention consists in certain novel features of construction and arrangements of parts which will be hereinafter more fully described and claimed and illustrated in the accompanying drawings, in which:

Fig. 1 is a side elevational view of a shoe polishing bracket and tree constructed in accordance with my invention.

Fig. 2 is a horizontal section taken on the line 2—2 of Fig. 1.

Fig. 3 is an enlarged cross section taken on the line 3—3 of Fig. 1.

Referring by numerals to the accompanying drawing, which illustrates a preferred embodiment of my invention, 10 designates a short arm of wood, plastics or light weight metal, one end of which is slightly widened so as to provide a foot 11 which is adapted to rest on the edge of a door and formed in the central portion of said arm is a longitudinally disposed slot 12.

Depending from the end of arm 10 opposite the foot 11, is a short arm 13, which is preferably inclined slightly outward, as shown in Fig. 1.

Formed through that portion of arm 10 above arm 13, is a longitudinally disposed bore 14, the inner end of which communicates with the adjacent end of slot 12, and passing through said bore is a rod 15, preferably metal, the outer portion of which is threaded as designated by 16, and the inner end within slot 12, is formed into an eye 17.

Loosely mounted on the threaded end of rod 15, is a washer 18 adapted to bear on the end of arm 10, and a winged nut 19 is mounted on the threaded portion of the rod, outwardly from said washer.

A double hook comprises diverging arms 20, the inner ends of which are connected by a half loop 21, which passes through eye 17. The outer portions of arms 20 are spaced so as to receive between them, the edge of a door such as D, and the ends of these portions terminate in hooks 22 which, when the bracket is in use, engage the spindle S, which carries the door knobs, K.

Adjustably mounted on the lower end of arm 13 is a shoe tree, preferably of the type shown in Fig. 1 and which includes a pair of parallel rods 23, carrying on their forward ends a substantially oval convex plate 24, adapted to enter the toe portions of shoes.

On the rear ends of said rods, is adjustably mounted an arm 25, carrying on its outer end, a convex plate 26, adapted to fit in the heel portions of shoes.

The bracket is mounted on a door by first loosening nut 19 on rod 15, so as to enable hooks 22 to be engaged over the door lock spindle S on opposite sides of the door and the nut is now screwed inward on rod 15 so as to force washer 18 against the end of arm 10 and thereby firmly clamp same against the door.

The shoe to be cleaned and polished is now placed on the tree comprising parts 24 and 26 and arm 25 is adjusted on the rear ends of rods 23 so as to cause said plate 26 to bear with pressure on the rear portion of the shoe heel structure, thus firmly mounting the shoe on the bracket during the cleaning and polishing operations.

Rods 23 carrying parts 24, 25 and 26 may be adjusted forwardly or rearwardly on the lower end of arm 13, and rigidly clamping thereto, by means of screws 27 which pass through clamping washers 28, between rods 23 and are driven into the lower end of said arm, as seen in Fig. 3.

Thus it will be seen that I have provided a shoe polishing bracket and tree which is simple in structure, inexpensive of manufacture and very effective in performing the functions for which it is intended.

Minor changes in the size, form and construction of the various parts of my improved shoe polishing bracket and tree may be made and substituted for those herein shown and described without departing from the spirit of the invention, the scope of which is set forth in the appended claim.

I claim as my invention:

In a shoe supporting means, an arm, a pair of door knob spindle-engaging hooks, releasable means on said arm adapted to draw said hooks into engagement with a door lock spindle and clamp the end of said arm against the edge of a door and means provided to extend within a shoe carried by the outer end of said arm for supporting the shoe.

IRA R. CROW.

REFERENCES CITED

The following references are of record in the file of this patent:

UNITED STATES PATENTS

| Number | Name | Date |
| --- | --- | --- |
| 915,516 | Walsh | Mar. 16, 1909 |
| 995,793 | Knoll | June 20, 1911 |
| 2,270,937 | Doering et al. | Jan. 27, 1942 |